Aug. 24, 1948.  E. MIKIS  2,447,711
PRECISION LEVELING CHUCK

Filed Jan. 16, 1946  2 Sheets-Sheet 1

INVENTOR.
ERNEST MIKIS
BY John A. Robertson
HIS ATTORNEY.

Aug. 24, 1948.  E. MIKIS  2,447,711
PRECISION LEVELING CHUCK
Filed Jan. 16, 1946  2 Sheets-Sheet 2

INVENTOR.
ERNEST MIKIS
BY John A. Robertson
HIS ATTORNEY.

Patented Aug. 24, 1948

2,447,711

UNITED STATES PATENT OFFICE 2,447,711

PRECISION LEVELING CHUCK

Ernest Mikis, San Antonio, Tex.

Application January 16, 1946, Serial No. 641,444

4 Claims. (Cl. 279—16)

This invention relates to chucks of the type commonly employed for work holding purposes and is concerned primarily with a chuck having precision leveling features.

At the present time the use of the conventional four-jaw chuck for work holding purposes in the many metal working machines is quite prevalent. The ordinary lathe chuck may be taken as typical and such a chuck generally includes four jaws, each of which is individually adjustable with respect to the jaw holder so that accurate adjustment of the work held between the jaws is feasible. However, the adjustment provided by the now known chuck of this type is limited to a single plane. Thus, while it is possible to accurately position a piece of work with respect to the working center of the lathe there are times when the axis of the work will not truly align with the axis of the lathe. If this discrepancy exists, it will, of course, show up in the ultimate product which is a highly undesirable condition.

With these factors in mind this invention has in view as its foremost objective the provision of a chuck of the character above noted which includes means separate and independent from the individual adjustment of the work holding jaws providing for adjustment of the axis of the work with respect to the working center of the machine in which the chuck is used. In carrying out this idea in a practical embodiment the invention proposes an arrangement in which the jaw holder has associated therewith instrumentalities for adjusting it as a complete assembly in a plane which it ordinarily assumes substantially normal to the working center of the machine. Thus, the position of the jaw holder is tilted, as occasion demands, with respect to the working axis of the machine.

A chuck of the type with which this invention is concerned ordinarily includes a main chuck body carrying a ball on which the jaw holder is operatively mounted. A further more detailed object of this invention is the provision in such a chuck of means for adjusting the jaw holder with respect to the chuck body.

Still more in detail, the invention has as an object the provision, in a chuck of the type indicated, of a screw actuated wedge device for adjusting the position of the jaw holder with respect to the chuck body. In carrying out this idea the jaw holder is formed with a series of tracks, each of which receives one element of a wedge device. Substantially opposite to each of these tracks and formed in the chuck body are cylindrical openings, each of which receives a screw actuator, the latter engages with the second element of the wedge device that is pivotly joined to the first element. As the screw actuators are operated to move the wedge elements which mesh therewith, the entire wedge assembly is moved to cause adjustment of the jaw holders with respect to the chuck body. It is important to note that the tracks in the jaw holder are inclined with respect to the cylindrical openings in the chuck body, thus providing the relative adjustment under the influence of the wedge assemblies.

Various other more detailed objects and advantages of the invention such as arise in connection with carrying out the above noted thoughts in a practical embodiment will in part become apparent and in part be hereinafter stated as a description of the invention proceeds.

The invention, therefore, comprises a precision leveling chuck consisting of a chuck body having a ball on which is adjustably mounted a jaw holder. The usual work holding paws are mounted for individual adjustment in the paw holder and wedge devices operatively associated with the chuck body and jaw holder provide for the adjustment of the latter by tilting the position of complete jaw holder assembly as a plane substantially normal to the working center of the machine in which the chuck is used.

For a full and more complete understanding of the invention reference may be had to the following description and accompanying drawings wherein.

Referring now to the drawings wherein like reference characters denote corresponding parts, and first more particularly to Fig. 2, the improved chuck of this invention is shown as comprising a main chuck body B and a jaw holder identified in its entirety by the reference character H.

Figure 3:
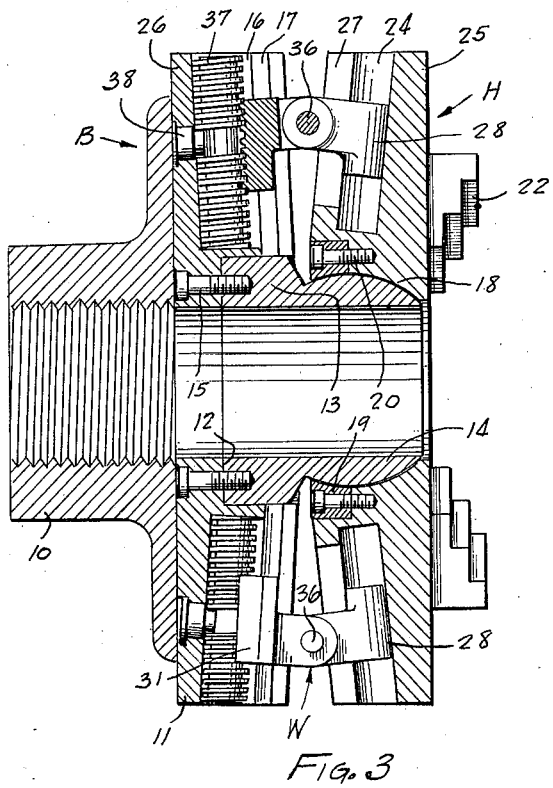
Fig. 3 is a transverse section taken about on the plane represented by the line 3—3 of Fig. 1

Upon referring to Fig. 3 it will be noted that the chuck body B includes an inner threaded shank 10 which may be utilized in assembling the chuck on a metal working machine such as a lathe. Carried by the shank 10 is a circular member 11 that is formed with a central cup-like recess 12 which receives the base 13 of a ball 14. It will be noted that the parts 12, 13, and 14 are formed with aligned bores which communicate with the threaded passage in the shank 10 and constitute substantially a continuation thereof. The base 13 may be secured in the recess 12 of the plate 11 in any preferred manner as by the screw fastening elements shown at 15.

The circular plate 11 is provided with a suitable number of radially extending cylindrical passages 16 which open at the front into slots 17. Any desired number of the passages 16 may be provided. Inasmuch as the chuck illustrated and herein described is a four-jawed chuck it is shown as including four of the passages 16 which are equiangularly spaced apart, thus providing for one of these passages every ninety degrees. Obviously the invention is not to be limited to just this particular number as it may be varied without departing from the spirit of the invention.

Figure 2:
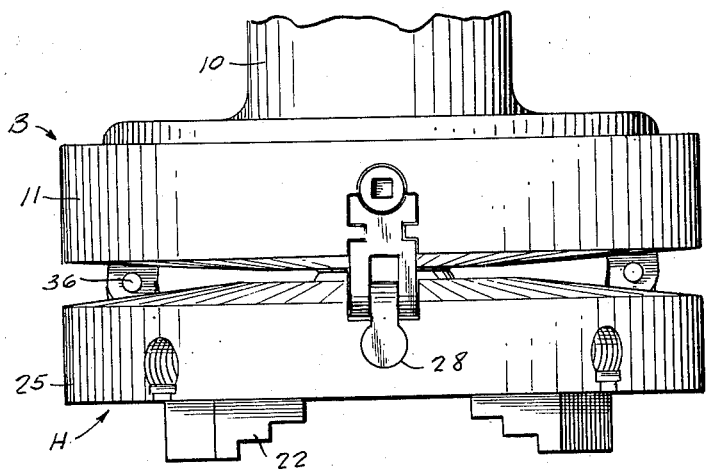
Fig. 2 is a top plan view of the chuck shown in Fig. 1.

The jaw holder H is of a circular plate-like formation corresponding to the plate 11 and is enlarged centrally as clearly shown in Figs. 2 and 3. This center portion is formed with a recess 18 which is complemental to the outer spherical surface of the ball 14 which is received therein. A retaining ring 19 which may be anchored in any preferred manner to the jaw holder H as by screw 20 serves to maintain the assembled relation of the jaw holder on the spherical member 14.

Figure 1:
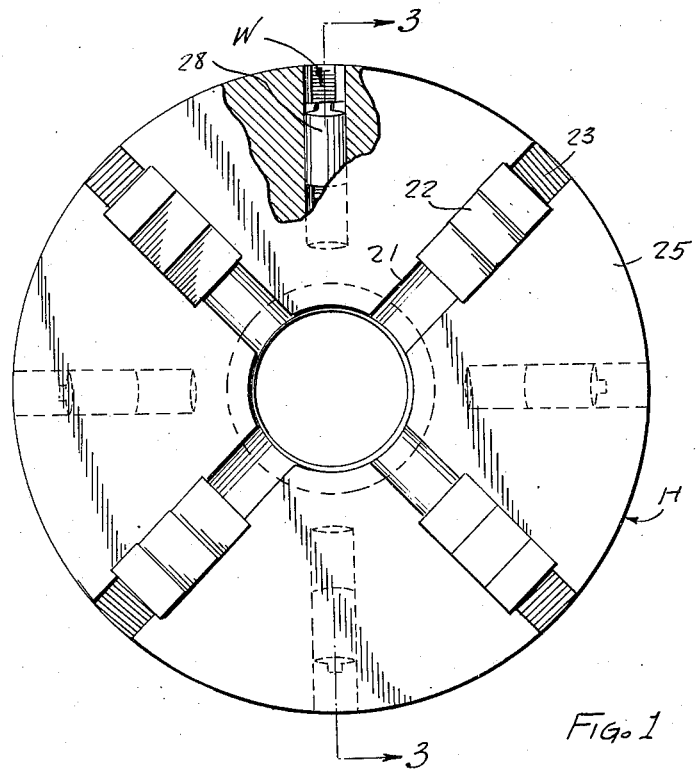
Figure 1 is a front view of a precision leveling chuck embodying the precepts of this invention. In this view parts are broken away to more clearly illustrate parts that would ordinarily be concealed and other parts are shown in dotted lines.

Referring now more particularly to Fig. 1, the jaw holder H is shown as being formed with a plurality, in this instance four, radially extending slots 21, and in each slot 21 there is positioned a work holding jaw 22. The outer ends of the slots 21 may be threaded as depicted at 23 to provide for the individual adjustment of each jaw 22. The particular manner in which each jaw 22 is adjusted is not a part of this invention. Four-jawed chucks of this type are well-known and they provide the means for adjusting each jaw individually.

Disposed opposite to the slots 17 of passages 16 and substantially midway between each pair of slots 21 in jaw holder H are tracks 24 which are inclined at an angle with respect to the face 25 which is substantially normal to the axis of the chuck as an entirety. The passages 16 and slots 17 are similarly inclined in a reverse direction and at substantially the same angle of inclination with respect to the face 26 of the plate 11 which is also substantially normal to the axis of the chuck.

There are four of the tracks 24 that are spaced ninety degrees apart and each of these tracks is substantially forty-five degrees from the adjacent slots 21. Each of the slots 24 opens on the rear face into a slot 27 which confronts the slot 17 of the opposite passage 16.

Figure 4:
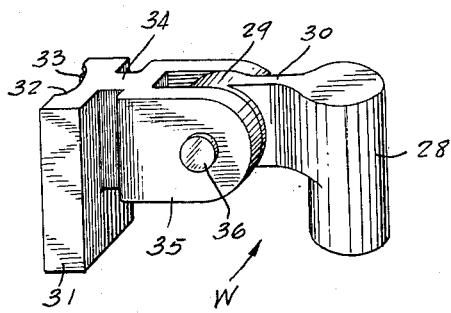
Fig. 4 is an enlarged detailed perspective of one of the wedge assemblies.

Referring now more particularly to Fig. 4, a wedge assembly is referred to in its entirety by the reference character W. The assembly W comprises a member 28 that is received in one of the tracks 24 and which is complemental in shape with respect thereto so as to slide snugly therealong and this member or plunger 28 is formed with an ear 29 that is thinned at 30 where it passes through the slot 27. A slide 31 is positioned in the slot 17 and extends into the passage 16 wherein it has a concave face in the form of a segment of a cylinder. This face is designated 32 and is threaded as indicated at 33. Connected to the element 31 is a neck 34 that carries a pair of spaced ears 35 which receive therebetween the ear 29. The ears 29 and 35 are formed with aligned openings through which passes a pivot pin 36. This establishes a pivotal relation between the slide 31 and the plunger 28.

Mounted on each passage 16 is a screw actuator 37 having threads meshing with the threaded face 33. It will be noted that the actuator 37 may be held against longitudinal movement in the respective passage 16 in any preferred manner such as by a stud 38 which cooperates with an interruption in the threads 37. The outer end of each actuator 37 is provided with a non-circular socket such as the square recess shown at 39 in Fig. 2 for wrench engaging purposes.

While the operation of the above described mechanism is believed to be obvious, it may be briefly outlined by noting that a piece of work such as a cylindrical shaft is first inserted into a position in which it will be engaged by the jaws 22 upon the relative contraction thereof. By properly adjusting these jaws the work may be brought so that its axis substantially coincides with the work center of the machine in which the chuck is used. However, should the axis of this piece of work be out of alignment with the working axis of the machine the jaw holder H may be adjusted as an entirety to bring these two axes into accurate coincidence. This is accomplished by employing a socket wrench in conjunction with the sockets 39 of the screw actuators 37. Thus, each wedge assembly W may be moved up or down as occasion requires to adjust the plane of the face 25 with respect to the working axis. This in turn adjusts the axis of the work held by the jaws 22 to bring it into the desired alignment.

While a preferred specific embodiment of the invention is hereinbefore set forth, it is to be clearly understood that the invention is not to be limited to the exact construction illustrated and described because various modifications of these details may be provided in putting the invention into practice within the purview of the appended claims.

What is claimed is:

1. In a chuck of the character described, a chuck body consisting of a circular plate formed with a central recess, said body being formed with a radially extending passage opening into a slot on one face of the body, a ball element carried by said chuck body, a jaw holder mounted on said ball element, a plurality of work holding jaws carried on said jaw holder, said jaw holder being formed with a track substantially opposite to said passage, there being a slot opening from said track into the rear of said jaw holder opposite to the slot in said chuck body, said passage and track being inclined with respect to each other, a wedge assembly mounted in said passage and track, and means to actuate said wedge assembly to cause relative adjustment of said jaw holder and chuck body.

2. In a precision leveling chuck of the character described, adjusting mechanism comprising a wedge assembly including a plunger adapted to be mounted in a track in a jaw holder, a slide adapted to be mounted in a passage in a chuck body, a pivotal connection between said plunger and slide, and screw means for actuating said wedge assembly.

3. In a chuck of the character described, a shank for securing said chuck in position in a metal working machine, a circular chuck body carried by said shank and formed with a plurality of passages equiangularly spaced apart, a ball element carried by said chuck body, a jaw holder having a shape corresponding generally to the shape of said chuck body and mounted on said ball element for adjustment with respect to said chuck body, a plurality of work holding jaws adjustably mounted in said jaw holder, said jaw holder being formed with a plurality of tracks corresponding in number and position to the passages in said chuck body, a wedge assembly cooperating with each pair of passage and track, and a screw actuator in said chuck body cooperating with each wedge assembly to actuate the latter.

4. In a precision leveling chuck, a jaw holder formed with four slots, four radially extending slots spaced ninety degrees apart, an adjustable work holding jaw in each slot, said jaw holder being formed with four radially extending tracks spaced ninety degrees apart with each track being disposed midway between each pair of slots, a chuck body, a ball element carried by said chuck body and adjustably supporting said jaw holder, said chuck body being formed with four radially extending passages substantially opposite to said tracks, a wedge assembly for each pair of each passage and track, each wedge assembly comprising a plunger in the respective track, a slide in the respective passage, and a pivotal connection between said plunger and slide, and a screw actuator in each passage cooperating with the slide of each wedge assembly.

ERNEST MIKIS.

REFERENCES CITED

The following references are of record in the file of this patent:

UNITED STATES PATENTS

| Number | Name | Date |
|---|---|---|
| 1,222,466 | Railton | Apr. 10, 1917 |

FOREIGN PATENTS

| Number | Country | Date |
|---|---|---|
| 96,510 | Switzerland | Oct. 16, 1922 |
| 18,034 | Great Britain | Aug. 27, 1908 |